May 14, 1968  E. H. FROHBIETER  3,382,682
METHOD FOR HARVESTING ICE BODIES AND APPARATUS FOR THE SAME
Filed Oct. 19, 1965  4 Sheets-Sheet 1
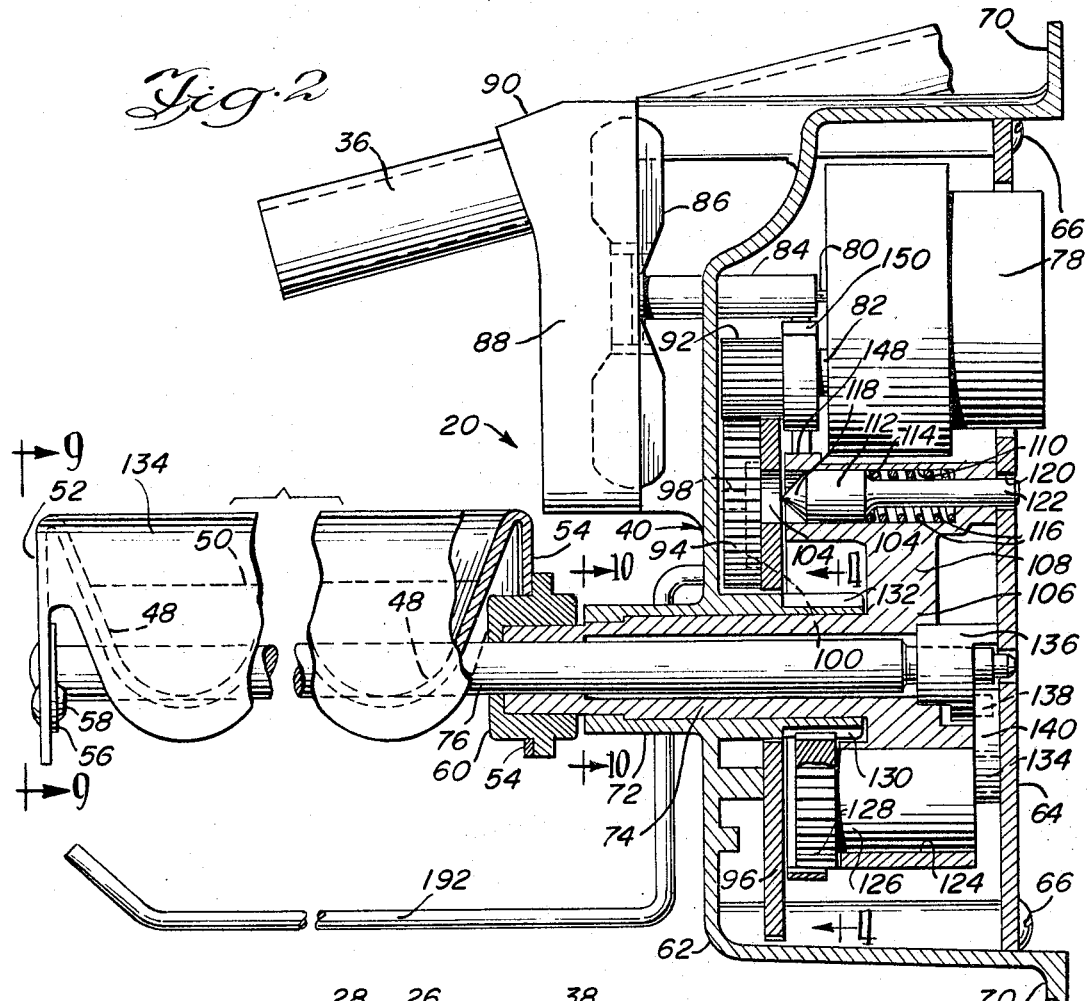
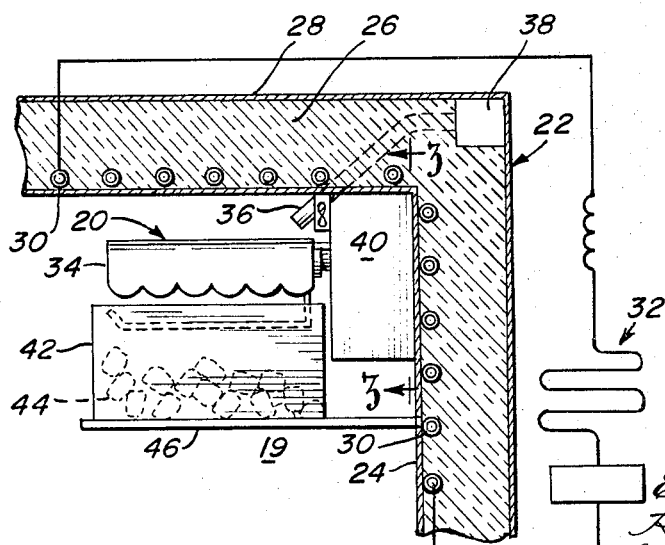
INVENTOR
Edwin H. Frohbieter
Hofgren, Wegner, Allen
Stellman & McCord
BY
ATTORNEYS

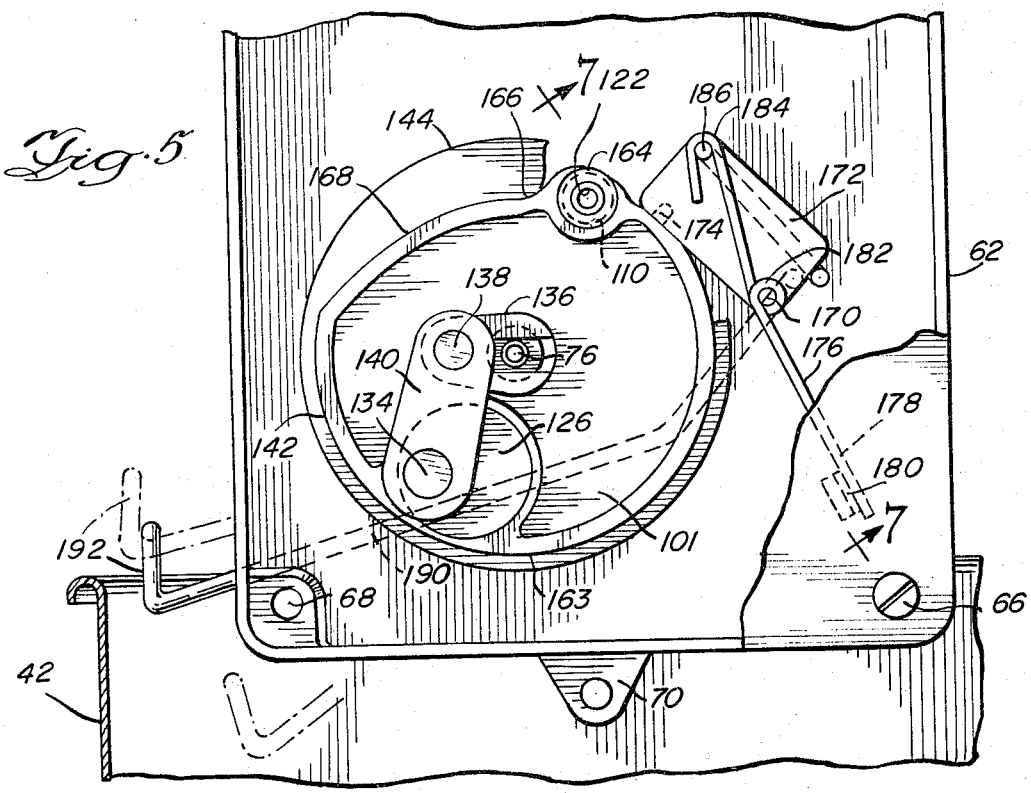
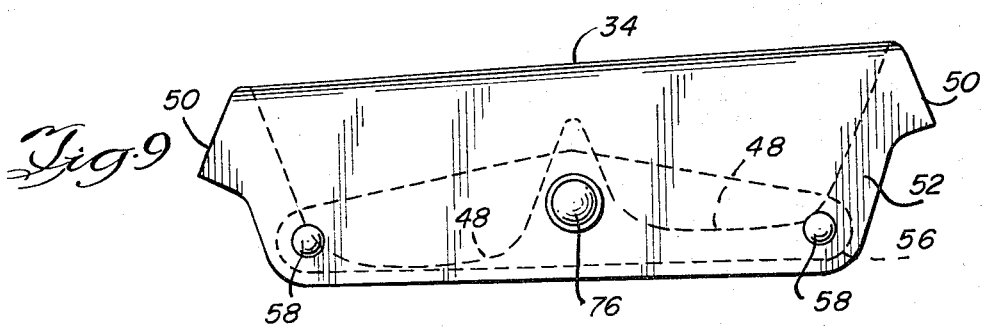
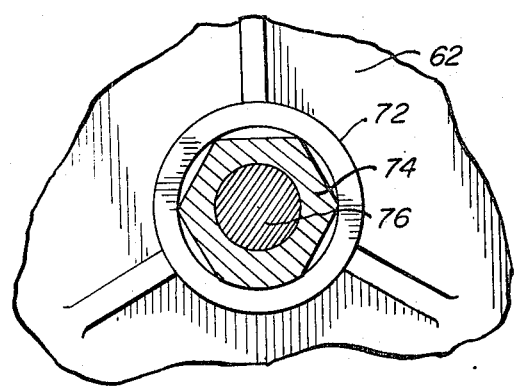

May 14, 1968   E. H. FROHBIETER   3,382,682
METHOD FOR HARVESTING ICE BODIES AND APPARATUS FOR THE SAME
Filed Oct. 19, 1965   4 Sheets-Sheet 4

United States Patent Office 3,382,682
Patented May 14, 1968

3,382,682
METHOD FOR HARVESTING ICE BODIES AND
APPARATUS FOR THE SAME
Edwin H. Frohbieter, Evansville, Ind., assignor to Whirlpool Corporation, a corporation of Delaware
Filed Oct. 19, 1965, Ser. No. 498,058
21 Claims. (Cl. 62—72)

ABSTRACT OF THE DISCLOSURE

A method of harvesting ice bodies from a flexible tray including the steps of unidirectionally rotating the tray while concurrently bidirectionally twisting the tray to positively free ice bodies contained therein; and an ice maker including a flexible tray and a mechanism for releasing the ice bodies from the tray by turning the tray about an axis with opposite ends of the trays being driven at different instantaneous rates, the ice maker including structure for supporting both ends of the tray from one end thereof, a single motor and control that function to so drive the tray and further to time the period of water introduction into the tray and assures that the tray is in a proper water receiving position and structure for sensing the level of ice bodies in a receptacle below the tray that have been discharged from the tray for controlling the ice making operation.

Disclosure

In one conventional form of apparatus for making and harvesting ice bodies, a mold or tray is provided for receiving water to be frozen therein by means of suitable refrigeration apparatus. The ice bodies, upon completion of their formation, must then be removed from the mold. After removal, they are conventionally stored in a suitable collecting bin, or the like, which may be maintained in the refrigerated space. In one further conventional form of such apparatus, means are provided for effecting the removal of the ice bodies from the tray by flexing the tray to effect the freeing of the ice bodies therefrom and then disposing the tray in an inverted position to drop the ice bodies therefrom into the collecting bin. The known apparatuses of this type have several serious disadvantages such as relatively high cost and impositive freeing of the ice bodies. The present invention comprehends such apparatus having new and improved means for making and harvesting the ice bodies eliminating the above discussed disadvantages of the known apparatuses.

It is a primary feature of the present invention, therefore, to provide an improved apparatus for making and harvesting ice bodies.

More specifically, a feature of the invention is the provision of a flexible tray secured, at spaced locations, to a pair of rotatable shafts and means for rotating the shafts at differing instantaneous rates of rotation whereby the flexible tray is twisted to free ice bodies retained therein and inverted to discharge such freed ice bodies.

Another feature of the invention is the provision of such an ice body maker and harvester wherein one of the shafts is driven at a greater instantaneous rate than the other shaft for a portion of the period of the operation thereof, and driven at a lesser instantaneous rate of rotation than the other shaft for another portion of the period of operation thereof, whereby the tray is twisted alternatively clockwise and counterclockwise to positively free the ice bodies from the tray.

Yet another feature of the invention is the provision of such apparatus having means interconnecting the two shafts for causing such differing instantaneous rates of rotation in response to movement of one of the shafts.

Still another feature of the invention is the provision of such apparatus having interconnecting means including a rotatable gear mounted on one of the shafts, a link eccentrically connected to the rotatable gear and the other shaft, and a fixed gear engaging the rotatable gear.

A further feature of the invention is the provision of such an ice body maker and harvester wherein the shafts are concentrically arranged.

A still further feature of the invention is the provision of such an ice body maker and harvester having a timing device for driving one of the shafts and an automatically operable clutch mechanism for engaging the shaft to be driven with the timing device after a predetermined time period sufficient to permit water in the tray to freeze has elapsed.

Another feature of the invention is the provision of such a clutch mechanism having a pair of axially misaligned gears being driven at differing rates of rotation, and including formations in the side thereof for predetermined, timed reception of a clutch pin carried by the shaft to be driven and cam means on the pin for camming the pin out of engagement with such formations before the predetermined time period required for the freezing of the water in the tray has elapsed.

Still another feature of the invention is the provision in an ice body maker and harvester of an improved means for accurately filling the tray with water to be frozen therein to form the ice bodies.

Yet another feature of the invention is the provision of such an ice body maker and harvester having a tray for receiving water, a shaft connected to the tray for inverting the tray to discharge the ice bodies formed therein, a rotatable element for driving the shaft, and control means for a water introducing means that is responsive to the positions of the rotatable element and the shaft for energizing the water introducing means for a predetermined time period only when the tray is in a proper position.

A still further feature of the invention is the provision of an ice body maker and harvester having such a control means for a water introducing means including a first cam surface on the rotatable element, a second cam surface on the shaft, a control arm for actuating the water introducing means responsive to both of the cam surfaces wherein the first cam surfaces accurately times the period of water introduction and wherein the second cam surface is formed to preclude the control arm from responding to the first cam surface except when the tray is in a proper position.

Yet another feature of the invention is the provision of such an ice body maker and harvester having a tray mounted on a shaft for rotation therewith to discharge ice bodies contained therein, a cam surface carried by the shaft, switch means biased against the cam surface for controlling rotation of the shaft, a level sensing arm mounted on the switch means for moving the switch means out of contact with the cam surface to stop rotation of the shaft when the ice level reaches a predetermined height, and wherein the cam surface also includes a configuration for abruptly swinging the level sensing arm to break frost accumulation thereon that would hinder the level sensing operation.

A still further feature of the invention is the provision of a method of harvesting ice bodies formed within a flexible mold wherein the mold is rotated during which time it is twisted in alternate directions to free the ice bodies contained therein.

Another feature of the invention is the provision of such a method wherein the mold is restored to its original shape at the termination of the twisting operation.

Other features and advantages of the invention will be apparent from the following description taken in connection with the accompanying drawings, in which:

FIGURE 1 is a side elevation of an ice body maker embodying the invention, and installed in a refrigerating apparatus shown partly in section;

FIGURE 2 is a side elevation thereof partly broken away and partly in section;

FIGURE 5 is a rear elevation thereof showing the back plate partially broken away;

FIGURE 9 is a front elevation of the tray;

FIGURE 10 is a fragmentary vertical section taken substantially along the line 10—10 of FIGURE 2;

Figure 3:
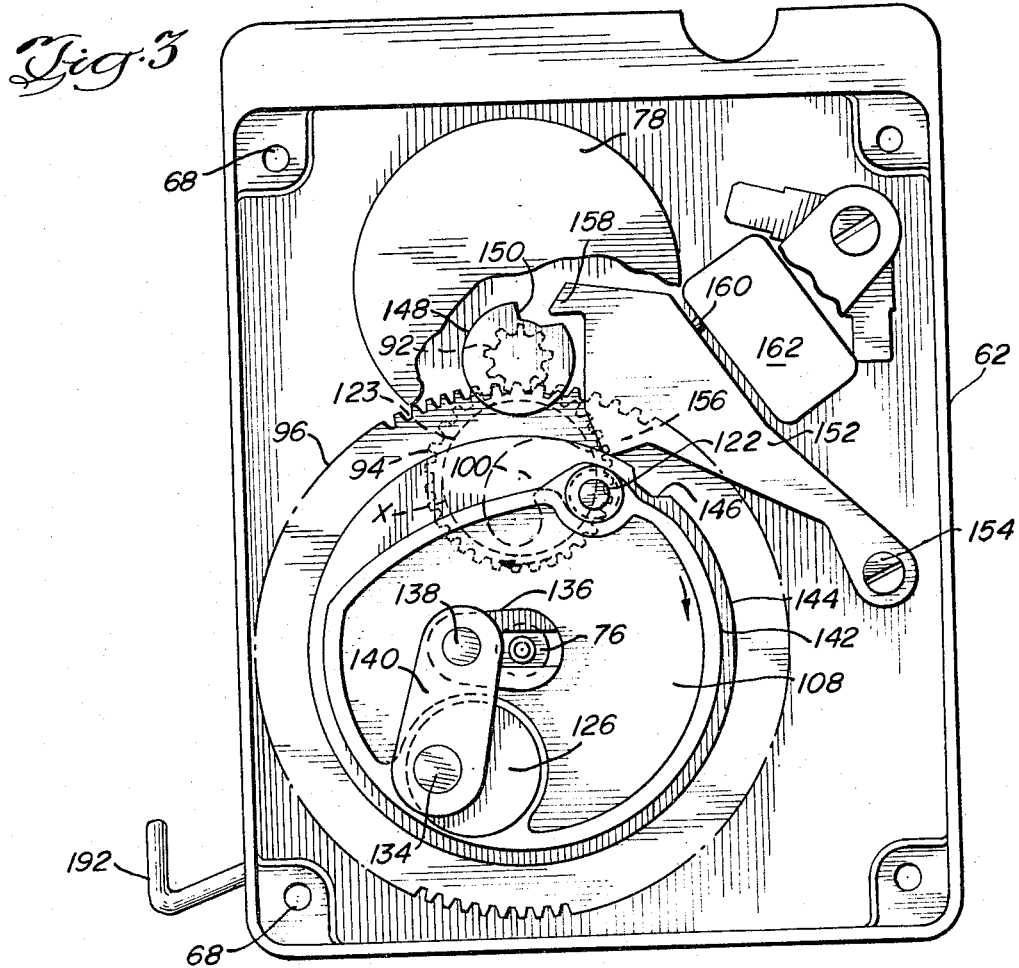
FIGURE 3 is a rear, partially broken, elevation thereof taken substantially along the line 3—3 of FIGURE 1.

In the exemplary embodiment of the invention as disclosed in the drawing, an ice body maker generally designated 20 is substantially mounted in a refrigeration apparatus 22, as shown in FIGURE 1. Refrigeration apparatus 22 is provided with a chamber 19 defined by an inner wall 24 surrounded by suitable insulating material 26 and an outer wall 28. Between outer wall 28 and inner wall 24, a refrigeration coil 30 is provided for conducting a suitable refrigerating fluid therethrough from a refrigeration means 32 for refrigerating the chamber 19.

The ice body maker 20 therein includes a distortable tray 34 made of a flexible material, such as polypropylene or polyethylene, for receiving water from a conduit 36 under the control of solenoid valve 38. The control means, generally designated 40, includes means for regulating the valve 38 and means for automatically releasing ice bodies from the tray 34 into a subjacent receptacle 42. The receptacle 42 may be supported on a suitable shelf 46 within refrigerated chamber 19.

Turning now to FIGURES 2 and 9, flexible tray 34 includes a plurality of mold cavities 48 in which the water is frozen to form the desired ice bodies. Tray 34 is provided with a pair of depending side flanges 50 and depending front and rear flanges 52 and 54, respectively, which extend downwardly to a point somewhat below the bottom of mold cavities 48. The front flange 52 bears adjacent its lower edge, and running substantially the length thereof, an elongated metal plate 56 which is secured thereto by suitable rivets 58. The rear flange 54 is rigidly secured by a suitable means, not shown, to a sleeve-like member 60. The purposes served by the plate 56 and the sleeve 60 will be described hereinafter.

Control 40 is placed within an open ended housing 62. The open end of housing 62 is closed by a back plate 64 held in place by screws 66 received in threaded recesses 68 (see FIGURE 3) in the housing 62. Additionally, the housing 62 is provided with flanges 70 for mounting the ice body maker within the cavity of refrigeration apparatus 22 by suitable securing means, not shown. On the front side of housing 62, opposite the back plate 64, there is provided a bushing 72 which projects therethrough. Received within the bushing 72 for rotation relative thereto is a hollow first shaft 74. Axially rotatably carried in shaft 74 is a second shaft 76. Both shafts 74 and 76 protrude from the bushing 72. Shaft 74 projects only a short distance therefrom and is received and secured within the sleeve 60. The shaft 76 extends substantially beyond sleeve 60 and generally below and between cavities 48 of the tray 34, and is secured to the plate 56 on the forwardly disposed downturned flange 52 of tray 34. Shafts 74 and 76 may be rotated at different instantaneous rates, as will be disclosed hereinafter, whereby tray 34 by virtue of its flexible nature and the rigid connection thereof to shafts 74 and 76 at spaced locations, is twisted to free the ice bodies contained therein. The tray is thus inverted to discharge such ice bodies into the subjacent receptacle 42 thereby to complete the harvesting operation.

To rotate the shafts 74 and 76, a timing motor 78 is provided in housing 62. Motor 78 includes a pair of output shafts 80 and 82. Output shaft 80 may be driven directly by the armature (not shown) of the timing motor 78 and supports an elongated sleeve 84 which projects to exteriorly of the housing 62. A suitable fan blade 86 is mounted on the end of the elongated sleeve 84 for circulating refrigerated air within the chamber 19 over the tray 34 to hasten the freezing of water contained therein. Blade 86 is surrounded by an annular baffle 88 having a downturned portion 90 on its upper edge to direct the cool air toward the top of tray 34.

The output shaft 82 of timer motor 78 rotates at a low rate of rotation, as for example, 0.5 r.p.m. A pinion gear 92 is mounted on the output shaft 82 and engages a pair of spur gears 94 and 96 (FIGURE 3). The spur gear 94 is mounted for rotation on a pin 98 (FIGURE 2) projecting inwardly from the front of housing 62, and spur gear 96 is mounted for rotation about the inwardly projecting portion of the bushing 72. As may be observed in FIGURE 3, the axes of rotation of the spur gears 94 and 96 are displaced from one another. Herein, spur gears 94 and 96 are arranged with respect to the pinion gear 92 such that for each revolution of the spur gear 96, the spur gear 94 rotates 2⅝ revolutions and the pinion gear 92 and 8 revolutions.

Figure 8:
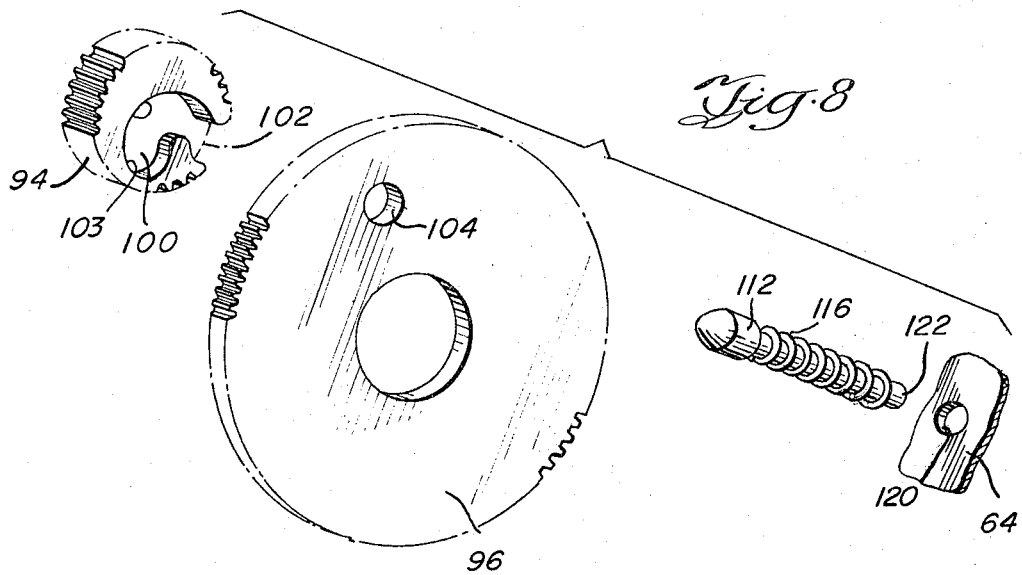
FIGURE 8 is an exploded view of the clutch mechanism.

On the side surface of spur gear 94 confronting the spur gear 96, there is provided a generally kidney-shaped recess 100 having an open end 102 (FIGURE 8) in the periphery of the spur gear 94 and an oppositely disposed end wall portion 103. Spur gear 96 is formed with an aperture 104 which is radially displaced from the axis of rotation thereof and positioned with respect to kidney-shaped recess 100, whereby it is periodically aligned therewith. This construction is best seen in FIGURE 2. Thus, spur gears 94 and 96, together with kidney-shaped recess 100 and aperture 104, form an automatic clutch mechanism for rotating the hollow shaft 74 upon the lapse of predetermined time periods as will be brought out in greater detail.

Shaft 74 includes a rear portion 106 disposed within housing 62 which supports a spider or carrier 108 for rotation therewith. As best seen in FIGURE 2, the carrier 108 includes a bore 110 receiving a pin 112 having an annular step 114. A spring 116 is interposed between the end of the bore 110 and the step 114 on the pin 112 to bias the latter toward spur gear 96. Bore 110 is radially displaced from the axis of rotation of hollow first shaft 74 whereby bore 110 and the pin 112 may be periodically aligned with aperture 104 in spur gear 96, which, as noted previously, may be periodically aligned with kidney-shaped recess 100 in spur gear 94. The end of the pin 112 adjacent the spur gear 96 is tapered, as shown at 118, and acts as a cam surface, as will be described hereinafter. The back plate 64 is provided with an aperture 120 for receiving a detent portion 122 formed on pin 112 to lock the carrier 108 and, thus, the shaft 74 against rotating during the ice body freezing cycle. Thus, during the freezing cycle, the pin 112 remains in a stationary position as shown in FIGURE 3. As gear 94 turns, the path traced by the axis of pin 112 if projected on gear 94 is a circle 123 shown in broken lines in FIG- URE 3. From this figure, it can be seen that entry of pin 112 into kidney-shaped recess 100 in gear 94 can occur only at one location, that is, at open end 102.

Figures 4, 6:
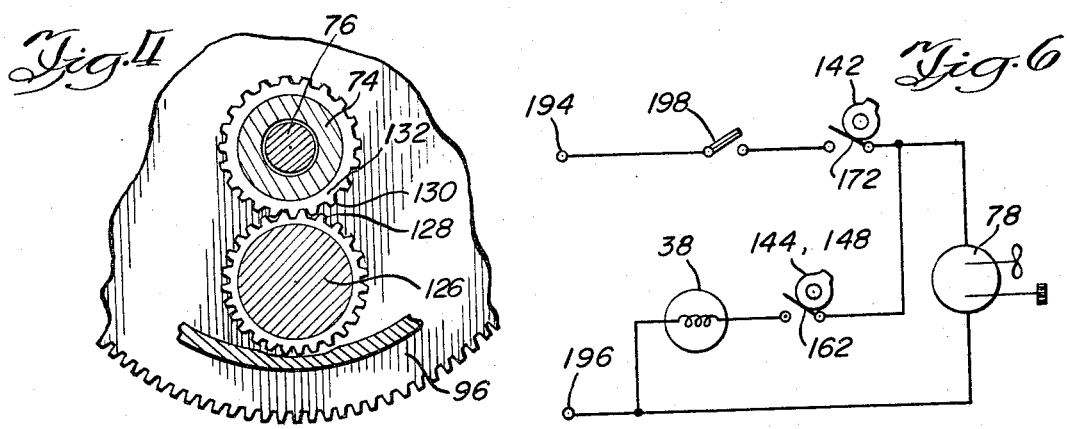
FIGURE 4 is a fragmentary vertical section taken substantially along the line 4—4 of FIGURE 1.
FIGURE 6 is a schematic diagram of the control system.

Carrier 108 is further provided with a second bore 124 in which is received a planet gear 126 having teeth 128. Teeth 128 engage teeth 130 of a fixed sun gear 132 which is formed on a portion of the interior projection of bushing 72 (FIGURES 2 and 4). As best seen in FIGURE 3, the planet gear 126 has a pin 134 eccentrically mounted on one side thereof. Shaft 76 on its end adjacent the back plate 64, mounts an arm 136 bearing a pin 138 to form a crank. Pins 134 and 138 are movably interconnected by a link 140 to provide means for rotation of shaft 76 selectively at greater and lesser instantaneous rates than that of the hollow first shaft 74.

Referring to FIGURE 3, the outer surface of the carrier 108 includes a pair of cam surfaces 142 and 144. Cam surface 144 is circular and is provided with a notch 146. Pinion gear 92, on shaft 82, carries a circular cam surface 148 which is provided with a notch 150. A pawl, or arm, 152 is pivotally mounted to the housing 62 at 154. Pawl 152 includes a pair of cam followers 156 and 158 which contact the cam surfaces 144 and 148, respectively. Pawl 152 is engaged by the spring loaded operator 160 of a normally closed switch 162. Switch 162 controls the solenoid valve 38 and, thus, the introduction of water to the tray 34 through the conduit 36. The cam surfaces 144 and 148, the notches 146 and 150, and the cam followers 156 and 158 cooperatively permit movement of the pawl 152 under the urging of the switch operator 160 only when both of the cam followers 156 and 158 may enter the notches 146 and 150, respectively, and thereby accurately control the delivery of water to tray 34.

Figure 7:
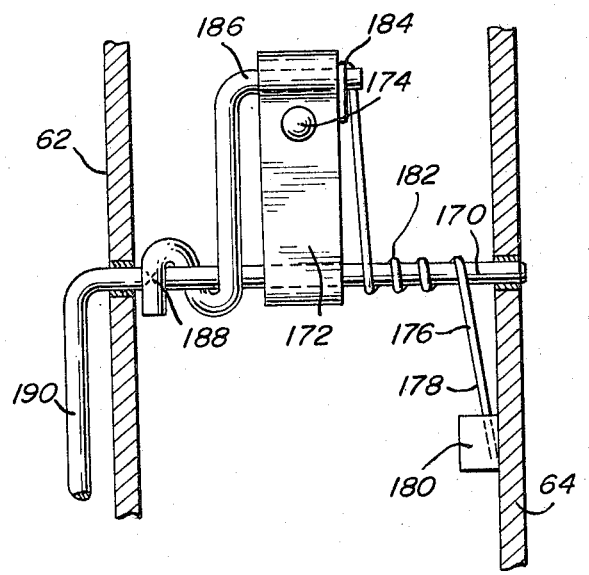
FIGURE 7 is a section taken substantially along the line 7—7 of FIGURE 5.

Turning now to FIGURE 5, the ice level sensing control includes the circular cam surface 142 of carrier 108. At one portion of cam 142, corresponding to that portion of carrier 108 in which the first bore 110 is formed, there is formed an outward projection 164 by a relieved, dip portion 166 which leads to a third portion 168 which gradually rises to a circular portion 163. Mounted adjacent cam surface 142 on a pivot rod 170 is a normally open switch 172 having an operator 174 in engagement with cam surface 142. A spring 176 biases switch 172 and, thus operator 174, against cam surface 142. The spring 176 includes a first end portion 178 which is held in position to bias switch 172 by means of a tab 180 which may be integrally struck from the back plate 64. The spring also includes a spiral portion 182 which is wound about pivot rod 170 to aid in positioning spring 176 to exert the desired bias, and a hooked, second end portion 184 which partially surrounds a rod 186 projecting through the body of the switch 172. Rod 186 is returned toward pivot rod 170 and is secured thereto by suitable means, such as welding 188 (FIGURE 7). The rod 170 includes a downward control continuation or arm 190 externally of housing 62 and a laterally projecting level sensing portion 192 which is adapted to contact ice bodies in the subjacent receptacle 42. Switch 172 and its operator 174 may be swung out of engagement with the cam surface 142 by upward movement of the level sensing portion 192 of the rod 170 to terminate the ice making operation.

The ice maker control includes a pair of terminals 194 and 196 (FIGURE 6) adapted to be connected to opposite leads from a suitable source of electric power (not shown). The line from the terminal 194 includes in series therewith a thermostatic switch 198, and normally open switch 172, which is responsive to the ice level in the receptacle 42 and is closed by the cam surface 142 only when the ice level is below a preselected level. The line from the terminal 194 is divided into a pair of parallel branches which are connected to the terminal 196. One of the parallel branches includes the timer motor 78, while the other parallel branch is comprised of the serial arrangement of normally closed switch 162 and solenoid valve 38.

The operation of the device is as follows. It will be assumed that the temperature within chamber 19 is below a preselected value which insures a satisfactory water freezing rate. Thus, thermostatic switch 198 will be closed. Assuming that the level of ice bodies in the receptacle 42 is low, switch 172 will be closed. The tray 34 may be assumed to have just received a charge of water. Under these conditions, as shown in FIGURE 6, the timer motor 78 will be energized. As a result thereof, the pinion gear 92 drives the spur gears 94 and 96. Once during every revolution of the spur gear 96, pin 112 is biased by the spring 116 into aperture 104 in the spur gear 96 and strikes the side of the spur gear 94 at some point along dotted circle 123, as seen in FIGURE 3. Continued rotation of the spur gear 96 causes the sides of the aperture 104 to engage the tapered point 118 of the pin and cam the latter out of the aperture 104.

Once in every nine revolutions of the gear 96, the pin 112, the aperture 104, and the open end 102 of the kidney-shaped recess 100 become aligned, as shown in FIGURE 3. Upon this occurrence, spring 116 biases pin 112 through aperture 104 and into open end 102 of kidney-shaped recess 100. As pin 112 has extended substantially to a point wherein the sides of the aperture 104 will not contact the tapered end 118, there is no camming action exerted on pin 112 by the gear 96. Additionally, such extension of the pin 112 withdraws the detent portion 122 thereof from aperture 120 in back plate 64 thereby freeing carriage 108 and shaft 74 for revolution. Pin 112 thus lodged in the aperture 104 locks the carrier to the spur gear 96 for rotation therewith. Referring again to FIGURE 3, clockwise rotation of gear 96 and carrier 108 in combination with clockwise rotation of gear 94, causes end 118 of pin 112 to completely disengage gear 94 by moving out of groove 100 through open end 102.

Figure 11:
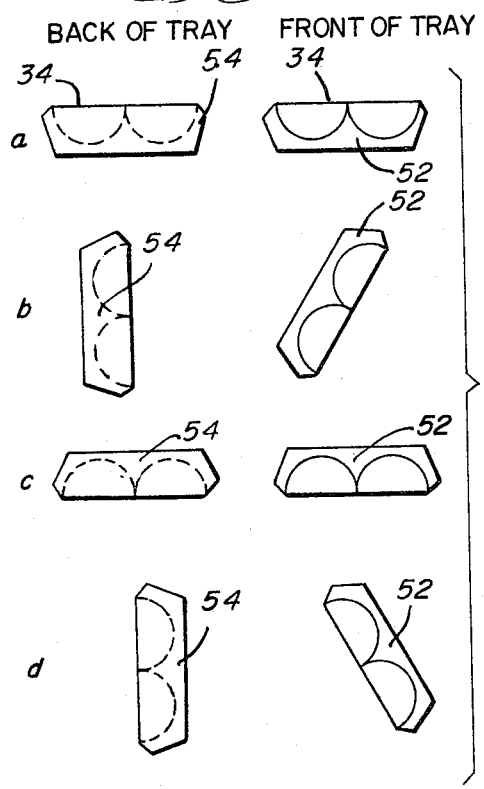
FIGURE 11a is a schematic illustrating relative positions of the back and front of the tray at one stage of the ice releasing cycle of the ice body maker as viewed from the rear of the ice body maker.
FIGURE 11b is a schematic illustrating such relative positions at a subsequent stage in the ice releasing cycle.
FIGURE 11c is a schematic illustrating such relative positions at a further subsequent stage.
FIGURE 11d is a schematic illustrating such relative positions at a still further subsequent stage.

As a result of the rotation of the carrier 108, hollow first shaft 74 is rotated and rotates the rear flange 54 of tray 34 to move the latter from an ice body forming position. Simultaneously therewith, planet gear 126 is rotated about the fixed sun gear 132 and due to its engagement therewith, rotates relative to the carrier 108. The rotation of the planet gear 126 relative to the carrier 108 places the link 140 in compression, which force in turn, through the crank arm 136, rotates the second shaft 76 relative to the carrier 108 in the shaft 74. As a result, front flange 52 of the tray 34, which is secured to the second shaft 76, is caused to be rotated at a greater instantaneous rate than rear flange 54, thereby twisting tray 34 to loosen ice bodies therein. The resulting relationship between the two flanges 52 and 54 is shown in FIGURE 11b. Link 140 is in such compression during approximately the first 90 degrees of rotation of carrier 108.

As carrier 108 continues to rotate, the planet gear 126 rotates relative thereto, link 140 is placed in tension for approximately the next 180 degrees of rotation of carrier 108. As a result, front flange 52 of tray 34 is rotated at a lesser instantaneous rate than rear flange 54 of tray 34, during the period of tension in link 140. After approximately 180 degrees of total rotation, tray 34 is fully inverted over the subjacent receptacle 42 and both the front and rear flanges 52 and 54 are approximately parallel as shown in FIGURE 11c. After about 270 degrees of total rotation, the back flange 54 of the tray 34 has rotated about 270 degrees, while the front flange 52 has rotated something less than 270 degrees. The resulting relationship between the front and rear flanges 52 and 54 is shown in FIGURE 11d.

During the next 90 degrees of rotation, link 140 is again placed in compression, thereby causing the second shaft 76 to rotate at a greater instantaneous rate than the hollow first shaft 73, so that upon completion of 360 degrees of rotation, the front and rear flanges 52 and 54 of the tray 34 are again approximately parallel (FIGURE 11a) and the tray 34 is restored to its original shape. By virtue of the use of both greater and lesser rates of rotation of the flange 52, the latter is rotated both clockwise and counterclockwise relative to the flange 54. The use of both clockwise and counterclockwise twisting results in effectively positive freeing of the ice bodies from the tray 34.

During the revolution of the tray 34 from approximately 90 degrees to 270 degrees, the tray is in a plurality of positions in which ice bodies may be discharged therefrom. Of course, the actual angular point in the revolution at which the tray is moved to its first and from its last ice body discharging position depends to some extent on the angular relation of the cavity walls to the plane of the top of the tray 34 and the degree of angular displacement of one flange with respect to the other. It will also be recognized that the tray 34 is twisted to differing configurations for each of the plurality of ice body discharging positions of the tray 34.

Immediately before the tray 34 is restored to an upright position, i.e. just prior to the completion of the full 360 degrees rotation thereof, notch 146 (FIGURE 3) in cam surface 144 is positioned with respect to the cam follower 156 on the pawl 152, so that cam follower 156 may enter the notch 146. Since pinion gear 92 on the timer motor 78 and cam surface 148 carried therewith move at a substantially greater rate of rotation than does the carrier 108, cam follower 158 on pawl 152 will be exposed to the notch 150 in cam surface 148 sometime during the period when the cam follower 156 may enter notch 146 in cam surface 144. When both of the notches are aligned with their respective cam followers, the pawl 152 pivots slightly thereby permitting switch 162 to energize solenoid valve 38 to deliver water through conduit 36 into tray 34. The length of time during which water may flow is determined solely by the amount of time that cam follower 158 is exposed to notch 150 in cam surface 148. As mentioned above, notch 150 travels faster than the notch 146. The greater rate of rotation of the pinion gear 92, and thus the cam surface 148 and notch 150 makes variations in the tolerances of the notch 150 relatively insignificant as compared to similar variations in the tolerances of the notch 146 which has a much slower rate of rotation. Because of the slow rotation of notch 146 and the short duration of the water fill operation, about ten seconds in one embodiment, it would be mechanically very difficult to design and machine a notch and cam follower that could provide the accuracy required in such water fill operation.

Notches 146 and 150 herein are arranged so that water introduction is initiated at about 15 degrees prior to a complete revolution of the carrier 108. The water delivery is terminated by the cam surfaces just prior to a complete revolution of carrier 108 by the camming of follower 158 out of the notch 150, and the resulting pivoting of pawl 152 and opening of switch 162 to de-energize and close solenoid valve 38. As carrier 108 approaches the end of its 360 degree revolution, the tapered cam portion 118 of pin 112 is confronted by spur gear 94. The size and rotation relationship of gears 94 and 96 is such that when pin 112 does encounter gear 94, the center of open end 102 of kidney-shaped recess 100 is positioned substantially at point X along broken line circle 123 wherein cam portion 118 readily enters the recess 100. As the two gears 94 and 96 continue to rotate, cam portion 118 of pin 112 follows the path of the kidney-shaped recess 100 in spur gear 94. Engagement of pin 112 within recess 100 continues until the tapered cam portion 118 strikes the end wall portion 103 of recess 100 at which time the pin 112 is cammed outwardly of recess 100. The camming movement is continued by the sides of the aperture 104 thereby camming the pin 112 out of the latter to force the detent portion 122 of pin 112 into aperture 120 in back plate 64. Carrier 108 is no longer locked to the spur gear 96, but rather is locked against rotation by the detent portion 122.

The timer motor 78 continues to run through succeeding cycles until such time as the timer motor 78 is de-energized by the temperature within the cavity of the refrigeration apparatus 22 rising to a preselected temperature such that the thermostatic switch 198 is opened or until such time as switch 172 is opened due to a high level of ice bodies in receptacle 42.

The level of ice bodies 44 in receptacle 42 is sensed during each revolution of carrier 108. Initially, sensing portion 192 is maintained at the position shown in solid lines in FIGURE 5. Upon initiation of rotation of the carrier 108, switch 172 and switch operator 174 are cammed clockwise about the pivot provided by rod 170 by the first outward projection 164 of cam surface 142. As a result of such movement of switch 172, sensing portion 192 is rapidly raised to approximately the position shown in the upper set of broken lines in FIGURE 5. Such abrupt movement provides for flexing of the spring 176 and movement of its associated parts to break loose any frost accumulation which may have otherwise caused the rod 190 and sensing portion 192 to hang up in a nonoperative position. Further rotation of carrier 108 and the cam surface 142 causes switch 172 to be rotated counterclockwise until it encounters the relieved portion 166 of cam surface 142. The counterclockwise rotation of switch 172 causes rod 190 and level sensing portion 192 to be swung downwardly into the receptacle until sensing portion 192 reaches a lowest point of travel (shown by the lower set of broken lines in FIGURE 5) determined by the depth of relieved portion 166. If during such travel, the level sensing portion 192 does not contact ice bodies in the receptacle 42, switch 172 will follow the configuration of the cam surface 142 under the bias of the spring 176 and will be maintained in closed condition. Further rotation of cam surface 142 causes the switch to be engaged by the gradually ascending portion 168 of cam surface 142 which cams switch 172 clockwise until substantially circular portion 163 is reached. Switch 172 is then maintained in a stationary position where level sensing portion 192 of rod 190 assumes the position shown in solid lines in FIGURE 5. As this position is achieved relatively early in the course of revolution of the carrier 108 and thus the tray 34, the level sensing portion 192 is withdrawn from the receptacle 42 during the greater portion of the filling thereof.

If, during the period of counterclockwise rotation of switch 172, the level sensing portion 192 encounters ice bodies 44 within the receptacle 42 limiting the downward travel of level sensing portion 192, switch 172 will be maintained in a stationary position, while the surface of cam 142 leading to the relieved portion 166 "falls away" from switch operator 174. This permits the switch operator 174 to extend to open the switch 172. When switch 172 is thusly opened, the latter, by virtue of its series connection with the other elements in the control circuit shown in FIGURE 6, interrupts the supply of power to such elements whereby operation of the device ceases. The ice body maker will remain inoperative until a sufficient number of ice bodies 44 have been removed from the receptacle 42 to permit the level sensing portion 192 to descend sufficiently to permit switch 172 to be again biased against cam surface 142 by spring 176. Upon such an occurrence, switch 172 will again be closed, and timer motor 78 thereby energized to continue rotation of the carrier 108 and ultimately, tray 34. The above described ice harvesting cycle will then be repeated until switch 172 is again opened by a high ice level within the receptacle 42 or the temperature within the cavity of the refrigeration apparatus 22 rises to a preselected temperature to open the thermostatic switch 198.

While I have shown and described one specific embodiment of my invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. An ice body maker and harvester comprising:
   a flexible tray adapted to receive water;
   a pair of rotatable shafts;
   means connecting said shafts to said tray at spaced locations thereon;
   means for rotating one of said shafts; and
   means responsive to rotation of said one shaft for rotatively driving substantially continuously the other of said shafts at an instantaneous rate differing from the rate of rotation of said one shaft for the period of revolution of said one shaft whereby said tray is twisted and inverted to release ice bodies therefrom.

2. The ice body maker and harvester of claim 1 wherein said shafts are coaxial, said other shaft being received within said one shaft.

3. The ice body maker and harvester of claim 1 wherein said means for rotating said one shaft comprises a rotatable timer motor and clutch means for automatically rotating said one shaft through a complete revolution after said timer motor has operated for a predetermined time period.

4. The ice body maker and harvester of claim 1 wherein said responsive means includes means rotating said other shaft at a greater instantaneous rate than said one shaft for a portion of said period and for rotating said other shaft at a lesser instantaneous rate than said one shaft for another portion of said period whereby said tray is alternately twisted in opposite directions to loosen ice bodies contained therein.

5. The ice body maker and harvester of claim 1 wherein said means for rotating one of said shafts includes a rotatable element drivingly associated with said one shaft, said ice body maker and harvester further including means for introducing water into said tray, and control means for said water introducing means responsive to the positions of both said rotatable element and said one shaft for energizing said water introducing means for a predetermined time period to accurately fill said tray with water.

6. The ice body maker and harvester of claim 1, wherein said means for rotating one of said shafts comprises a motor, said ice body maker and harvester further including a cam surface carried by said one shaft, normally open switch means biased against said cam surface to be closed thereby and movably mounted relative thereto, said switch means being serially connected with said motor to control energization thereof, means for sensing the level of ice bodies in a receptacle, said means comprising a lever adapted to be positioned within a receptacle and connected to said switch means whereby said arm will swing said switch means away from said cam surface to deenergize said motor when the ice level exceeds a predetermined amount, said cam surface including means for swinging said arm out of a receptacle during the filling thereof.

7. An ice body maker and harvester comprising:
   a flexible tray adapted to receive water;
   first and second rotatable shafts;
   means connecting said shafts to said tray at spaced locations thereon;
   means for rotating one of said shafts; and
   means responsive to rotation of one of said shafts for rotatively driving the other of said shafts at an instantaneous rate different from that of said one shaft for at least a portion of the period of such revolution, said responsive means comprising first means movably mounted on one of said shafts, second means movably mounted on said first means and the other of said shafts for rotating the other of said shafts, and third means for moving one of said first and second means relative to the shaft on which it is mounted during actuation of said rotating means.

8. The ice body maker and harvester of claim 7 wherein said first means comprises a rotatable gear mounted on said first shaft, said second means comprises a link eccentrically connected to both of said first gear and said second shaft, and said third means comprises a fixed gear engaging said rotatable gear.

9. Apparatus for providing ice bodies, comprising:
   a mold formed of resilient material for forming an ice body therein;
   first support means connected to a first portion of said mold;
   second support means connected to a second portion of said mold spaced from said first portion; and
   means for concurrently moving said support means substantially continuously in the same direction but at different rates to effect relative movement therebetween thereby to bodily move the mold and concurrently twist the mold between said portions seriatim in opposite twist directions for freeing the ice body from the mold.

10. The apparatus of claim 9 wherein said mold moving means comprises means for moving the mold to an ice body ejecting position during a first twist movement in the first of said opposite directions.

11. The apparatus of claim 9 wherein said mold moving means comprises means for disposing the mold for ejection of ice bodies therefrom and said moving means is arranged to effect twisting of said mold in each of said opposite directions while the mold is in the ice body ejection disposition.

12. The apparatus of claim 9 wherein said mold moving means comprises means for disposing the mold for ejection of ice bodies therefrom and said moving means is arranged to initiate twisting of the mold prior to the movement of the mold to the ice body ejecting disposition.

13. An ice body maker and harvester comprising:
   a tray adapted to hold water for forming ice bodies therein;
   means for cyclically harvesting ice bodies formed in said tray including first and second rotatable elements;
   means for introducing water into said tray; and
   control means for said water introducing means including a first cam surface on said first rotatable element for timing the period during which water is introduced into said tray, a second cam surface on said second rotatable element, and a control arm for actuating said water introducing means adapted to contact both of said cam surfaces, said second cam surface including means for precluding said arm from responding to said first cam surface except for a predetermined position of said tray.

14. The ice body maker and harvester of claim 13 wherein said second rotatable element comprises a shaft secured to said tray whereby the position of said shaft is indicative of the position of said tray.

15. An ice body maker and harvester comprising: a flexible tray adapted to receive water; a pair of rotatable shafts; means connecting said shafts to said tray at spaced locations thereon; means for rotating one of said shafts comprising a rotatable timer motor and clutch means for rotating said one shaft through a complete revolution after said timer motor has operated for a predetermined time period, said clutch means comprising a first gear, having an aperture spaced from its center, concentrically arranged about said one shaft and rotatable relative thereto, a second gear having its axis of rotation spaced from that of said first gear and having a recess including an open end therein adapted to be periodically aligned with said aperture, said first and second gears being in driving engagement with said motor, a pin carried by said one shaft and biased toward said aperture and arranged to be periodically received therein and to be received within said recess and said aperture when said pin, said recess and said aperture are aligned, and means for camming said pin out of said aperture when said recess, said aperture and said pin are misaligned; and means responsive to rotation of said one shaft for rotating the other of said shafts at an instantaneous rate differing from the rate of rotation of said one shaft for at least a portion of the period of revolution of said one shaft whereby said tray is twisted and inverted to release ice bodies therefrom.

16. An ice body maker and harvester comprising: a flexible tray adapted to receive water; a pair of rotatable shafts; means connecting said shafts to said tray at spaced locations thereon; means for rotating one of said shafts including a rotatable element; means for introducing water into said tray; control means for said water introducing means responsive to the positions of both said rotatable element and said one shaft for energizing said water introducing means for a predetermined time period to accurately fill said tray with water, said control means including a first cam surface on said rotatable element for timing the period during which water is introduced into said tray, a second cam surface carried by said one shaft, a control arm adapted to contact both of said cam surfaces for actuating said water introducing means, said second cam surface including means for precluding said arm from responding to said first cam surface other than when said one shaft is in a predetermined position; and means responsive to rotation of said one shaft for rotating the other of said shafts at an instantaneous rate differing from the rate of rotation of said one shaft for at least a portion of the period of revolution of said one shaft whereby said tray is twisted and inverted to release ice bodies therefrom.

17. An ice body maker and harvester comprising: a flexible mold tray for holding water and forming ice bodies therein; a hollow shaft secured to one end of said tray; a shaft disposed within said hollow shaft and secured to the opposite end of said tray; said shafts being the sole support of said tray; and motor means drivingly connected to at least one of said shafts for providing relative motion between said shafts and for inverting said tray whereby relative motion between said shafts loosens ice bodies within said tray and inversion of said tray discharges ice bodies therefrom.

18. The ice body maker and harvester of claim 15 including a detent portion on said pin and means for positively engaging said detent portion to preclude rotation of said one shaft when said recess, said aperture, and said pin are out of alignment.

19. A method of harvesting ice bodies from a flexible tray having opposite ends and a mold cavity in which ice bodies are formed comprising the steps of: unidirectionally rotating the tray from an ice body forming position through a plurality of ice body discharging positions and returning the tray to the ice body forming position while in said discharging positions; twisting the tray by rotating both ends of the tray in the same direction but rotating one end of the tray in advance of the other end thereof and subsequently reversely twisting the tray by continuing to rotate both ends in the same direction but rotating said other end in advance of said one end; and returning the tray to its original configuration.

20. The method of claim 19 wherein the second twisting step includes applying a force to the mold to restore the mold to its original untwisted shape.

21. An ice body maker and harvester comprising: a tray adapted to receive water; means for introducing water into said tray; a rotatable shaft connected to said tray for inverting said tray to discharge ice bodies therefrom and for returning said tray to an upright water receiving position, said shaft having first cam means formed thereon; means including a rotatable element for rotating said shaft at a first speed, said rotatable element having second cam means formed thereon and being rotatable at a second speed for timing the operation of said water introducing means; and control means for said water introducing means including a control member arranged to simultaneously contact both said first and second cam means, said control member causing actuation of said water introducing means only when said first and second cam means are disposed in a desired predetermined relationship corresponding to the upright water receiving position of said tray.

References Cited

UNITED STATES PATENTS

| | | | |
|---|---|---|---|
| 2,646,666 | 7/1953 | Vlasic | 62—345 |
| 2,942,435 | 6/1960 | Nelson | 62—353 X |
| 3,048,023 | 8/1962 | Taylor | 62—353 X |
| 3,056,271 | 10/1962 | De Turk | 62—353 |
| 3,071,933 | 1/1963 | Shoemaker | 62—353 X |
| 3,143,863 | 8/1964 | Nelson | 62—72 |
| 3,144,078 | 8/1964 | Morton et al. | 62—351 X |
| 3,199,309 | 8/1965 | Brubaker | 62—345 |
| 3,208,233 | 9/1965 | Linstramberg | 62—137 |
| 3,217,510 | 11/1965 | Kniffin et al. | 62—353 |

ROBERT A. O'LEARY, *Primary Examiner.*

MEYER PERLIN, *Examiner.*

W. E. WAYNER, *Assistant Examiner.*